3,307,447
FLUID CELL WITH JET INLET DIRECTED TOWARD WINDOW

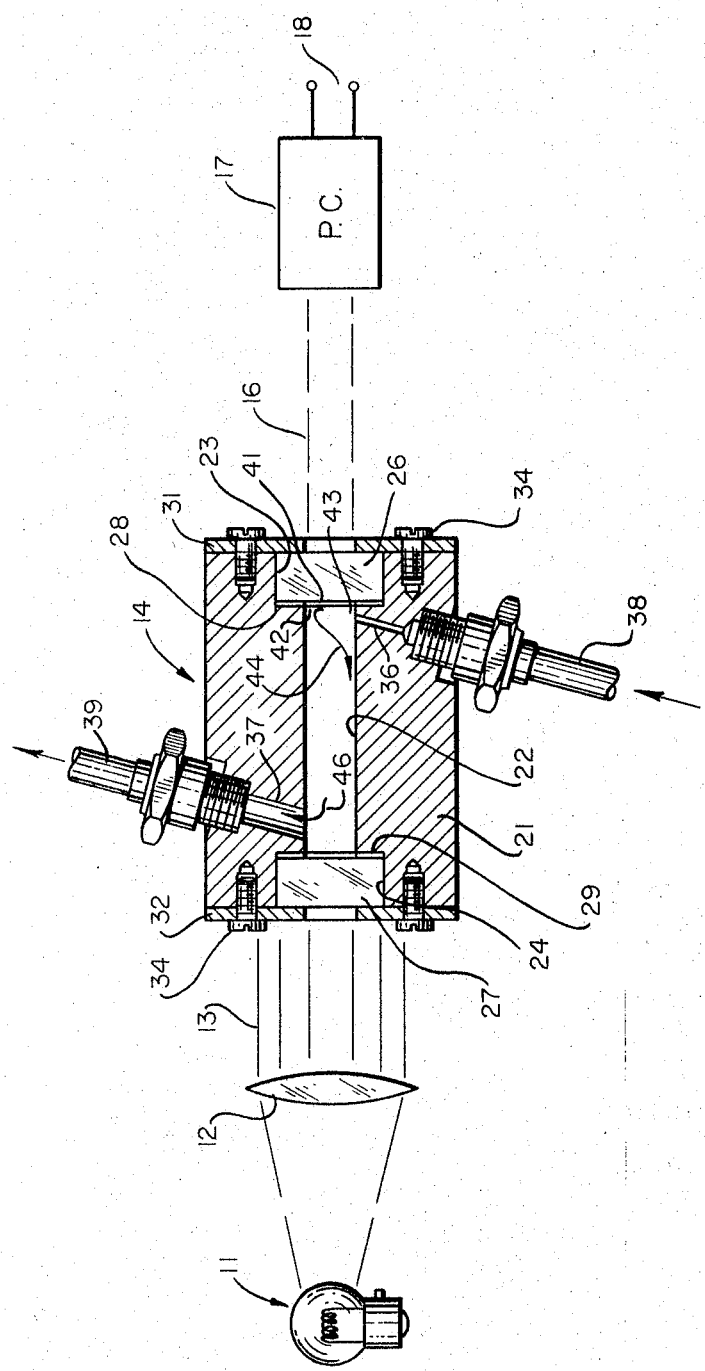

Joseph G. Carleton, Palo Alto, and Lee Gropper, Sunnyvale, Calif., assignors to Beckman Instruments, Inc., a corporation of California
Filed Nov. 4, 1963, Ser. No. 321,204
2 Claims. (Cl. 88—14)

This invention relates generally to an optical analyzing apparatus and fluid cell therefor, and more particularly to an optical analyzing apparatus and fluid cell which presents a relatively long fluid path for analysis.

Prior art fluid cells have been constructed so that they offer a smooth channel so that the fluid does not undergo any mixing. In general, the cells of the prior art consist of an elongated tube or channel having an inlet at one end and an outlet at the other end with the inlet and outlet being of substantially the same diameter whereby to minimize any possible turbulence. The light beam is projected through the cell at right angles with respect to the fluid flow. To increase the path length, the cells are provided with a flat portion to define a path which was relatively narrow and long. Care is taken to provide a smooth transition.

It is an object of the present invention to provide an improved optical analyzing apparatus and fluid cell therefor.

It is another object of the present invention to provide an optical analyzing apparatus in which the fluid channel is arranged with its axis parallel to the light whereby to provide a relatively long fluid path.

It is a further object of the present invention to provide a compact axial flow fluid cell which is constructed so that the fluid is mixed as it enters the cell.

It is another object of the present invention to provide a fluid cell which does not have standing eddies, pockets of denser fluid and non-flowing density gradients.

It is a further object of the present invention to provide an axial flow cuvette in which entrapment of bubbles is minimized.

According to the principal aspect of the present invention, there is provided a fluid cell for an optical analyzing apparatus in which the cell has an elongated channel with windows at each end thereof whereby to provide a relatively long fluid chamber. The cell has inlet and outlet openings communicating with opposite ends of the channel with the inlet opening being substantially smaller in cross section than the outlet opening and sufficiently small to form a jet stream to cause mixing of fluid in the cell adjacent one end thereof. Also, the inlet opening is directed toward the window at said one end of the fluid channel in the cell so that fluid passing through the inlet opening impinges upon said window in order to eliminate any standing fluid adjacent to said window and to assure that there is a good mixing of fluid across the face of the window.

These and other objects and aspects of the invention will become more clearly apparent from the following description when taken in conjunction with the drawing presented.

Referring to the drawing, there is schematically illustrated a light source 11 which may be an incandescent lamp or other suitable light source. The light radiated from the source 11 is collimated by lens 12 to provide light beam 13 which impinges upon the fluid cell 14, to be presently described in detail. The light travelling through the cell and fluid within the cell emerges at 16 and impinges upon a transducer 17 which may, for example, be a photocell. The transducer provides an electrical output signal at the terminals 18 which is indicative of the intensity of light impinging thereon.

The cell 14 includes a body 21 which may be made of any suitable material such as non-corrosive metal or plastic. Preferably, the body is made of polyvinyl plastic. The cell body may be bored to form a cylindrical opening 22, or otherwise machined to form an opening or channel 22. The ends of the body 21 are machined to provide slots or grooves 23 and 24, respectively. These grooves accommodate windows 26 and 27, respectively. The grooves or notches may extend entirely across the body and the windows 26 and 27 may comprise a rectangular window. Gaskets 28 and 29 having openings which coincide with the channel are placed one at each end of the channel between the corresponding window and body portion. Retainers 31 and 32 are secured to the ends of the body as, for example, with screws 34. By tightening of the screws 34, the windows are urged against the seals to provide a seal.

The chamber defined by the inside surfaces of the spaced windows 26 and 27 and the walls of the channel 22 comprises the analyzing chamber through which the fluid to be analyzed is passed.

The channel or chamber is provided with an inlet 36 and outlet 37. Fittings 38 and 39 are provided for connecting the inlet and outlet to associated equipment.

It is to be observed that the inlet opening 36 has a considerably smaller diameter than the outlet opening 37 whereby for a given flow of fluid through the channel, the fluid has a much higher velocity at the inlet than in the channel and outlet. In effect, there is produced a fluid jet at the inlet. Because of the differences of velocity, turbulence sets in. This fluid jet is directed to impinge upon the inner face 41 of the window 26. The turbulence in the corner 42 between the window and channel eliminates any standing fluid. The fluid jet also gives rise to a pumping action at the corner 43 to thereby assure that there is good mixing across the fluid front at the window 26.

The fluid then flows slowly axially through the cuvette as indicated generally by the arrows 44 and 46, and outwardly from the opening 37. The opening 37 is of substantially larger diameter whereby the fluid flows without turbulence from the chamber.

Thus, the inlet opening is so directed towards the rear and against the window to flush out what would otherwise be dead corners and to give efficient mixing. The inlet diameter is extremely small so that the jet action provides the necessary mixing within the confined cuvette chamber. The outlet, on the other hand, is relatively large compared to the inlet to prevent the formation of possible dead spaces for the entrapment of fluid adjacent the same. Furthermore, the uphill flow from the lower inlet opening to the higher outlet opening prevents the entrapment of bubbles.

The cylindrical chamber formed can be of any desired length to give greater sensitivity. It can be relatively large in diameter to permit more overall light. It is to be observed, of course, that with longer path lengths, there is some loss of resolution since any new sample portion is analyzed along with the previous fluid in the chamber. Thus, it is seen that there is provided a compact, efficient fluid cell for use in optical analyzing apparatus.

We claim:
1. A fluid cell for optical analyzing apparatus comprising:
   a body of material;
   an elongated channel formed in said body;
   windows disposed at each end of said channel to define therewith a fluid chamber;
   an inlet opening formed in said body and communicating with one end of said channel;
   an outlet opening formed in said body and communicating with the other end of said channel;

said inlet opening being directed toward the adjacent window whereby fluid passing through the inlet opening impinges upon said window; and said inlet opening having a cross-sectional area which is substantially less than the cross-sectional area of the outlet opening and sufficiently small to form a jet stream to cause mixing of fluid in the adjacent portion of the chamber.

2. A fluid cell as in claim 1 wherein the inlet opening is disposed below the outlet opening.

References Cited by the Examiner
UNITED STATES PATENTS

| | | | |
|---|---|---|---|
| 2,301,367 | 11/1942 | Cahusac et al. | 250—218 X |
| 2,650,562 | 9/1953 | Bonar et al. | 88—14 |
| 2,688,089 | 8/1954 | Williams | 250—218 X |
| 2,761,067 | 8/1956 | Troy | 250—218 X |

RALPH G. NILSON, *Primary Examiner.*

J. D. WALL, *Assistant Examiner.*